No. 803,499. PATENTED OCT. 31, 1905.
J. W. MILLER.
BALE TIE MACHINE.
APPLICATION FILED MAR. 1, 1905.
12 SHEETS—SHEET 1.

WITNESSES:
INVENTOR
J. W. Miller
BY
Rennie & Goldsborough
Attorneys

No. 803,499. PATENTED OCT. 31, 1905.
J. W. MILLER.
BALE TIE MACHINE.
APPLICATION FILED MAR. 1, 1905.

WITNESSES:
W. H. Durand
E. J. O'Neill

INVENTOR
J. W. Miller
BY
Pennie & Goldsborough
Attorneys

No. 803,499. PATENTED OCT. 31, 1905.
J. W. MILLER.
BALE TIE MACHINE.
APPLICATION FILED MAR. 1, 1905.

WITNESSES:
INVENTOR
J. W. Miller
BY
Pennie & Goldsborough
Attorneys

UNITED STATES PATENT OFFICE.

JOHN W. MILLER, OF WAUKEGAN, ILLINOIS, ASSIGNOR TO THE AMERICAN STEEL & WIRE COMPANY OF NEW JERSEY, OF WORCESTER, MASSACHUSETTS, A CORPORATION OF NEW JERSEY.

BALE-TIE MACHINE.

No. 803,499.      Specification of Letters Patent.      Patented Oct. 31, 1905.

Application filed March 1, 1905. Serial No. 247,893.

*To all whom it may concern:*

Be it known that I, JOHN W. MILLER, a citizen of the United States, residing at Waukegan, Lake county, State of Illinois, have invented certain new and useful Improvements in Bale-Tie Machines; and I do hereby declare the following to be a full, clear, and exact description of the invention, such as will enable others skilled in the art to which it appertains to make and use the same.

The invention relates to machines for making bale-ties having a twisted loop at one end, and has for its object to provide in a machine of this general class certain improvements in the various mechanism for bending and twisting the loops, for stripping the finished ties, for making ties of different lengths, for counting the finished ties, and for discharging the ties in bundles containing a predetermined number; and it consists of various novel arrangements and combinations of parts hereinafter described, and pointed out in the claims.

In the accompanying drawings.

Figure 1:
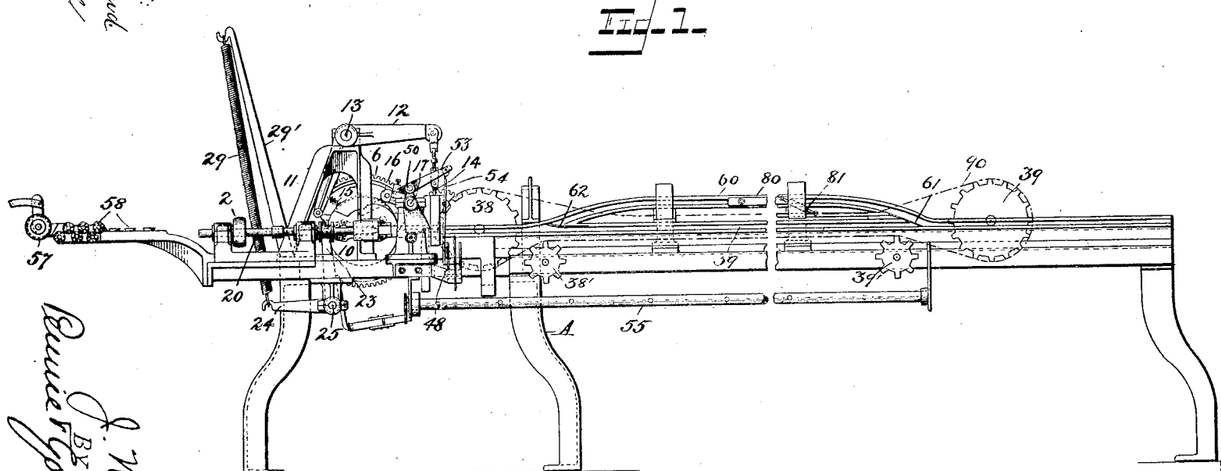
Figure 1 is a side elevation of the machine.
Figure 2:
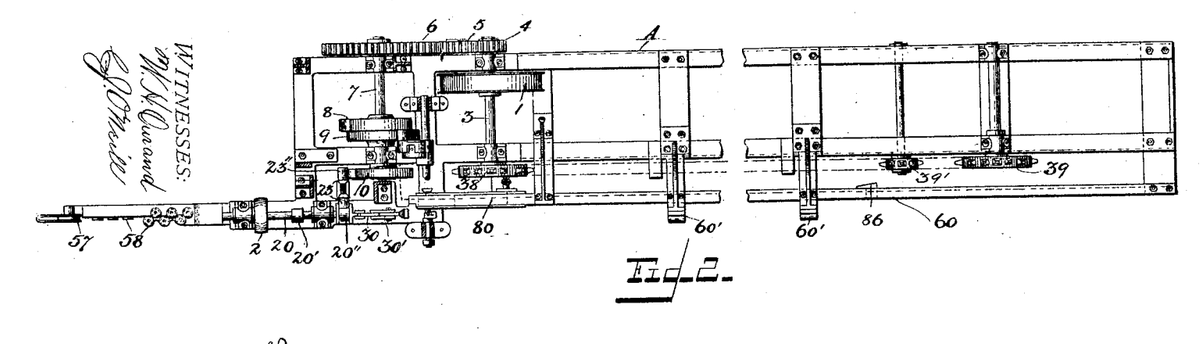
Fig. 2 is a plan view thereof.
Figure 3:
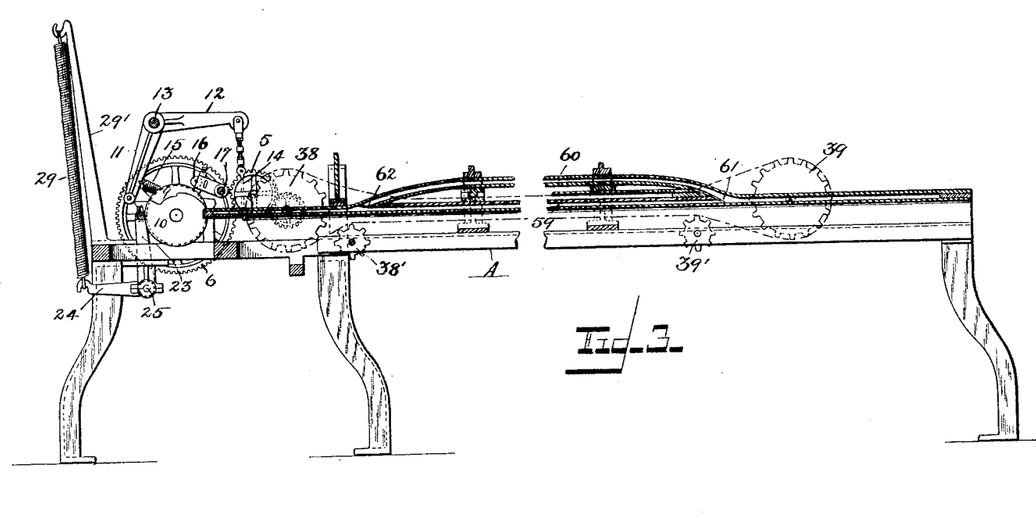
Fig. 3 is a longitudinal section of the machine.
Figure 4:
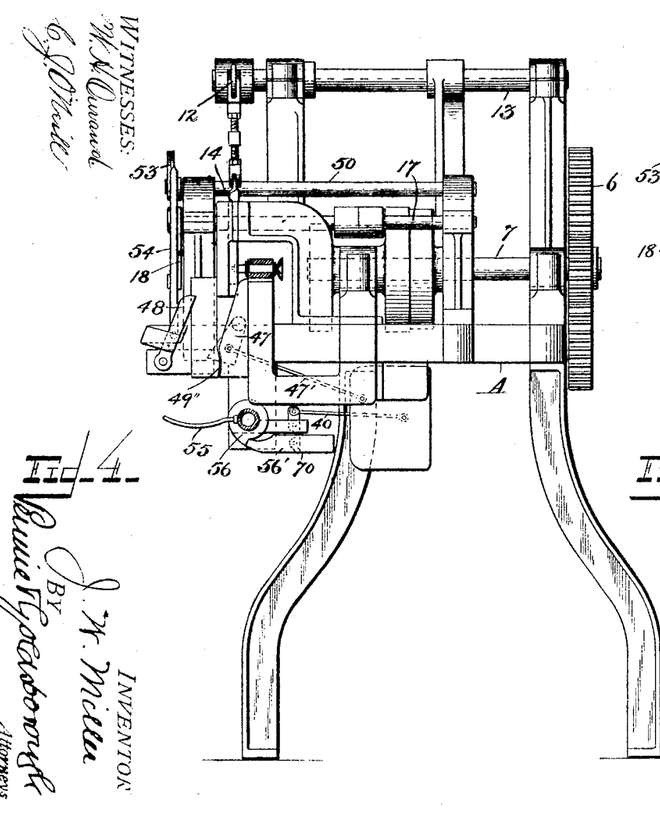
Fig. 4 is an enlarged end elevation.
Figure 5:
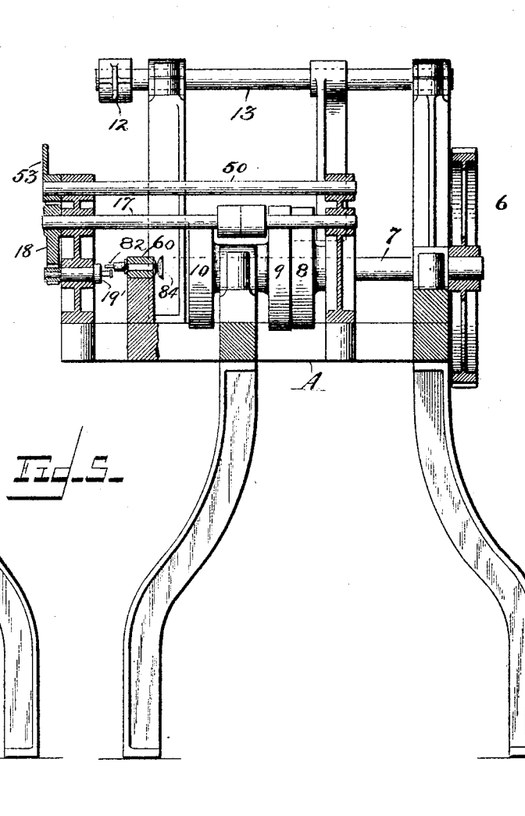
Fig. 5 is a transverse section.

Referring to the drawings, and more particularly to Figs. 1, 2, and 3 thereof, A indicates the frame of the machine, which consists of a rectangular bed supported by suitable legs or standards. Mounted in suitable journal-bearings on the top of said frame is a shaft 3, having thereon a main power-pulley 1. On the outer end of said shaft is a gear-wheel 4, meshing with an intermediate pinion 5, which drives gear-wheel 6, fast upon transverse shaft 7. Mounted upon said shaft 7 are cams 8, 9, and 10, which serve to operate the cut-off, loop-former, and twister mechanism, as will be more particularly described hereinafter.

Extending from the forward part of the machine is a suitable longitudinal bracket carrying a guide-roll 57 and straightening-rolls 58, through which the wire is fed from the ordinary reels to the twister. Said twister consists of a hollow spindle 20, mounted for rotatory and reciprocatory motion in a bracket fast to the machine-frame. Mounted upon said spindle 20 is a driving-pulley 2, which is preferably belted to the same counter-shaft from which the main pulley 1 is operated. Said pulley 2 is formed integrally with a bushing 2', which constitutes one of the bearings for the spindle in the bracket, and is connected with the spindle 20 by a feather 2'', so that while said pulley imparts a rotatory motion to the spindle the latter may slide freely through said pulley. The details of the twister are more particularly shown in Figs. 15 to 22, inclusive, and, referring to the former figure, 20' is an adjustable collar, which is secured to the spindle 20 by means of suitable set-screws to limit the forward movement of said spindle and for this purpose is mounted upon the spindle between the arms of the bracket in which said spindle is journaled. Slidably mounted upon said spindle 20 is a collar 20'', which is connected by suitable toggle-levers 30 30 to the pivoted arms 30' 30' of the twister-head. Said twister-head consists of the arms 30' 30', above referred to, which are pivoted intermediate their ends upon studs 32 32, mounted in cheek-plates 31 31, lying on opposite sides of the forward end of the spindle 20. On the forward end of the arms 30' 30' are the clamping-jaws, which consist of hardened steel blocks having a horizontal gripping edge 33 and an inclined gripping edge 34, the corresponding edges of the respective jaws coöperating to grip the looped end of the wire and hold the tail of the loop firmly against the main body portion of the wire, as will be more particularly explained hereinafter. A helical spring 35 is connected to the arms 30' 30' in proximity to the connection of said arms with the toggle-levers 30 30 and serves to pull said arms together, so as to open the clamping-jaws at the opposite ends of the arms.

Pivoted to the under side of the machine-frame upon stud 25 is a bell-crank lever having arms 23 24, and upon the former of said arms are secured two bowls or rollers 23' 23'', the roller 23' engaging the collar 20'', between the flanges thereof, and the roller 23'' coöperating with the edge of the cam 10, fast upon shaft 7. The arm 24 of the bell-crank lever is connected with a stout helical spring 29, which is attached at its other end to an upwardly-projecting arm or bracket 29'. The function of the spring 29 is to rock the bell-crank lever and to successively advance the spindle 20 and close the clamping-jaws of the twister, while the operation of cam 10 is to rock the bell-crank lever in the opposite direction against the tension of spring 29, whereby the clamping-jaws are released and the spindle 20 is retracted.

In the machines of this general type as heretofore constructed it has been customary to provide clamping-jaws mounted upon a rotating but non-reciprocating spindle, and the gripping motion of said jaws was usually accomplished by a positive cam action, while the release of said jaws was brought about by a retractile spring. The action of the old form of twister therefore was not uniform in that as soon as the operating parts began to wear considerable lost motion crept in, and if the parts were tightened up to transmit the direct pressure of the operating-cam to the clamping-jaws there was great liability of some of the parts being broken. The spring 29, however, not only serves to impose just the proper degree of pressure to the gripping-jaws at all times and irrespective of any wear or lost motion, but also minimizes the chances of breaking parts of the twisting devices, as said spring would yield before the parts would rupture.

Figures 31, 32, 33:
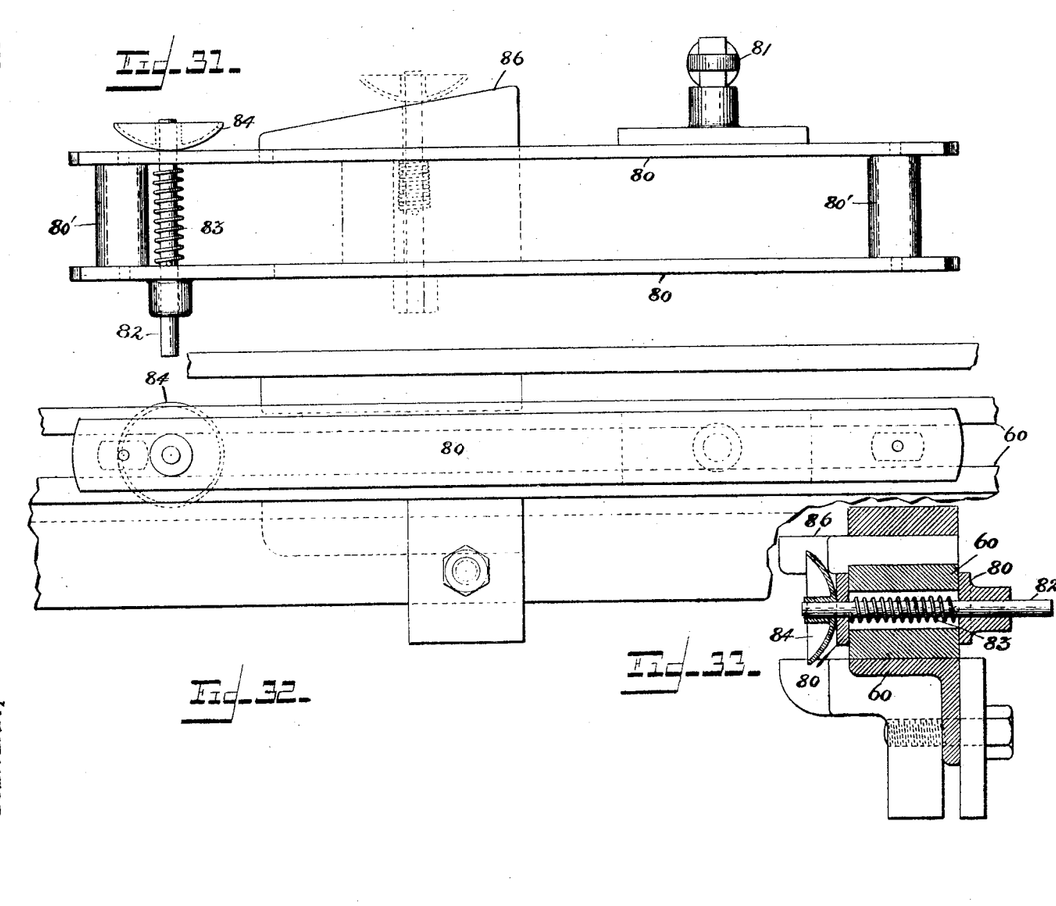
Fig. 31 is a plan view of one of the shuttles and the stripping mechanism, the dotted lines indicating the relation of the loop-supporting pin and the cam for retracting the same in the stripping operation.
Fig. 32 is an end elevation of one of the shuttles in the track or shuttle-guide.
Fig. 33 is a transverse section through the shuttle and track.

Mounted upon the shaft 3 is a driving sprocket-wheel 38, which serves to operate the drive-chain 90, which passes over an idler sprocket-wheel 39 at the other end of the machine and engages suitable guide sprocket-wheels 38' 39', mounted between the two sprocket-wheels aforesaid, so as to bring the upper and lower reaches of said chain 90 in proper relation to the longitudinal shuttle-guide or trackway, which consists of the lower member 59 and an upper or return member 60. This trackway serves as a guide for suitable shuttles 80, which serve to draw the wire through the machine after the loop has been formed on the end of said wire. The lower member 59 of the trackway extends from the rear of the machine to a point in proximity to the clamping-jaws of the twister, and the upper member 60, which lies between the two sprocket-wheels 38 and 39, is provided with spring switch members 61 62, which serve to direct a returning shuttle from the lower section 59 into said upper section 60 and from said latter section back into the lower section, as will be understood by those familiar with this type of machine. The shuttles 80 are connected with the drive-chain by suitable links 81, so that said shuttles are moved in opposite directions along the respective trackways and are held stationary at each end of their travel, while the particular links to which they are attached travel around the sprocket-wheels 38 39. Each of said shuttles consists of two cheek-pieces separated by distance-blocks 80' 80', these cheek-pieces engaging opposite faces of the trackway, as shown in Fig. 33. Mounted in the forward end of the shuttle, as illustrated in Figs. 31 and 32, is a pin or arbor 82, about which the loop in the end of the bale-tie is formed. Said pin 82 is slidably mounted in the opposite cheek-pieces and is held with its end normally projected beyond one of said cheek-pieces by means of a helical spring 83, which is confined between a transverse pin in the pin or arbor 82 and the opposite cheek-piece of the shuttle. The opposite end of the pin or arbor 82 is provided with the convex or generally cup-shaped stop or detent 84, which is adapted to be engaged by a cam or wedge 86, projecting from the side of the trackway and serving to retract the pin or arbor 82 and free the loop carried thereby.

Figure 6:
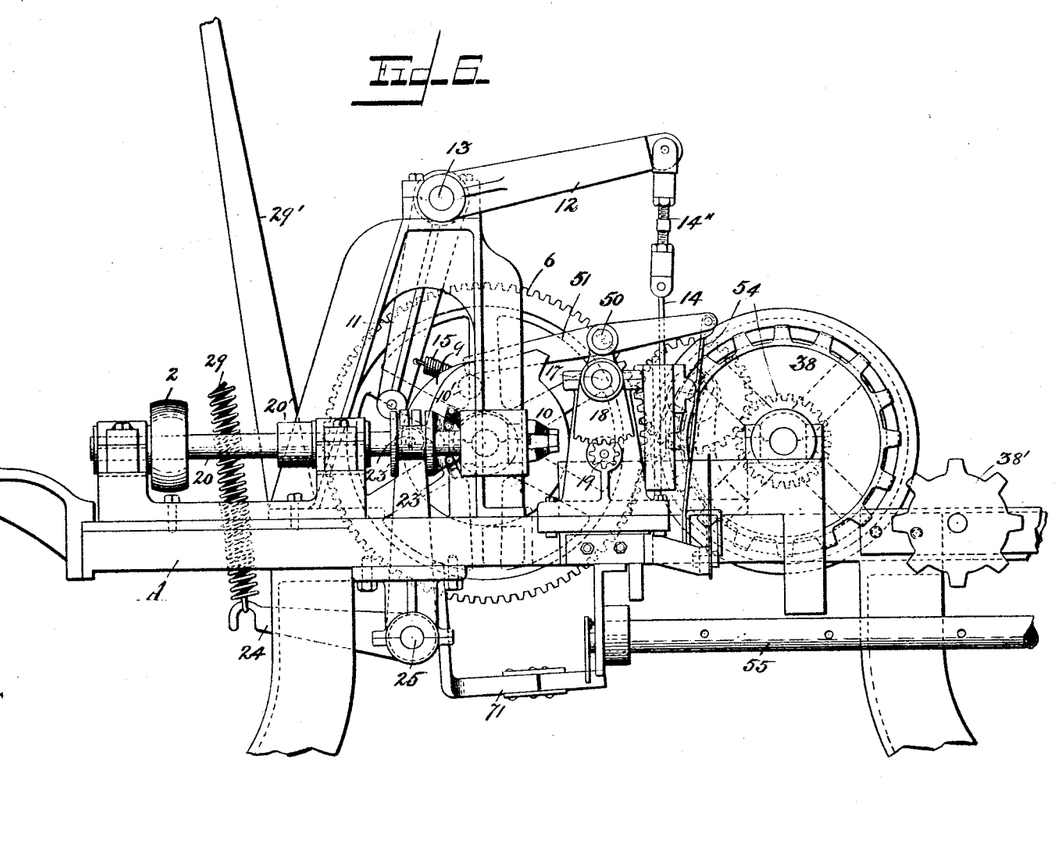
Fig. 6 is an enlarged side elevation of the front end of the machine.
Figure 7:
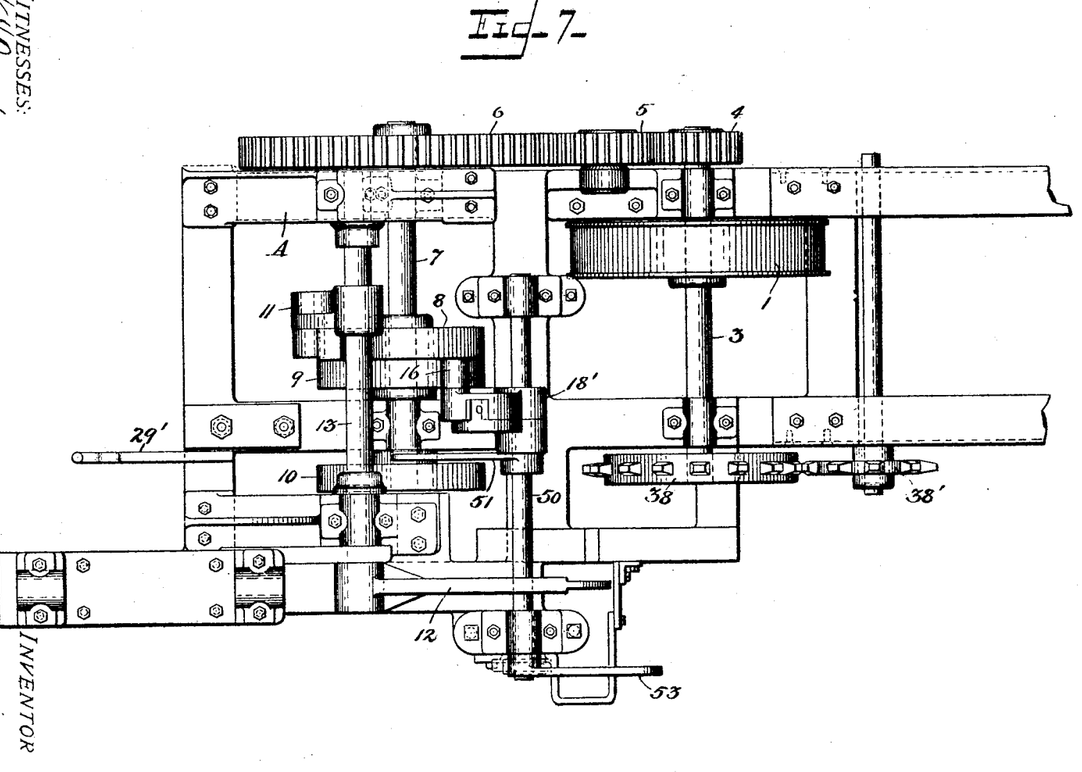
Fig. 7 is a plan view of the parts illustrated in Fig. 6.
Figure 8:
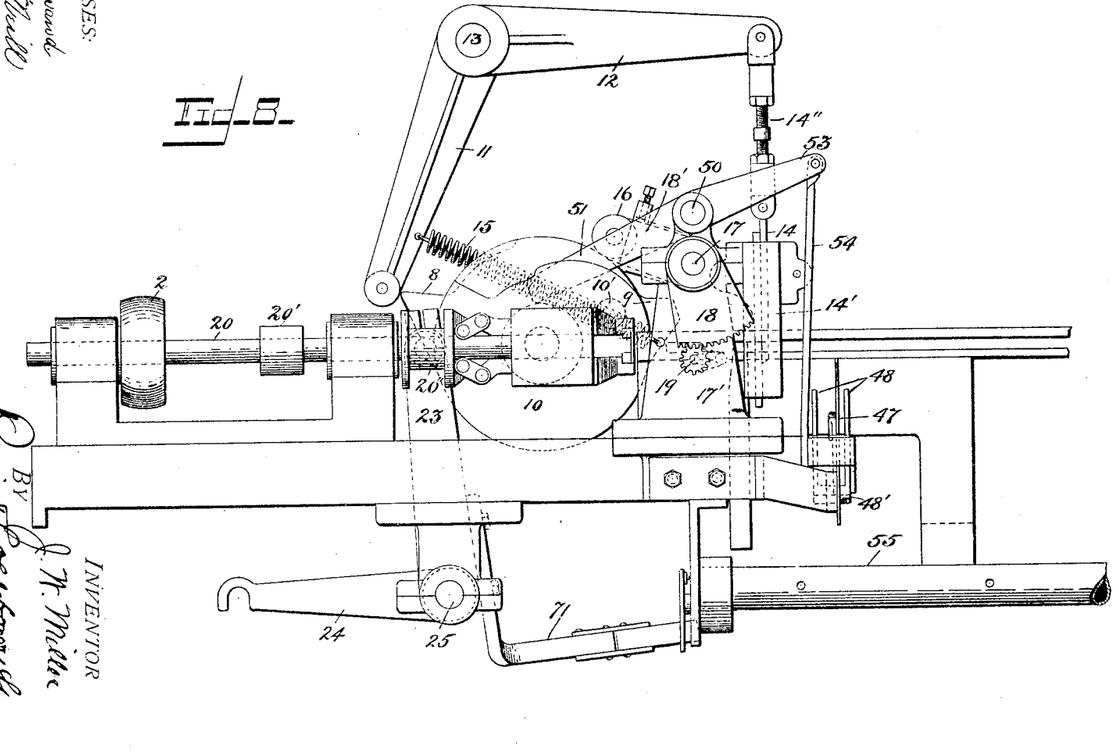
Fig. 8 is a view corresponding to that in Fig. 6, certain parts of the mechanism being omitted for sake of clearness.
Figure 9:
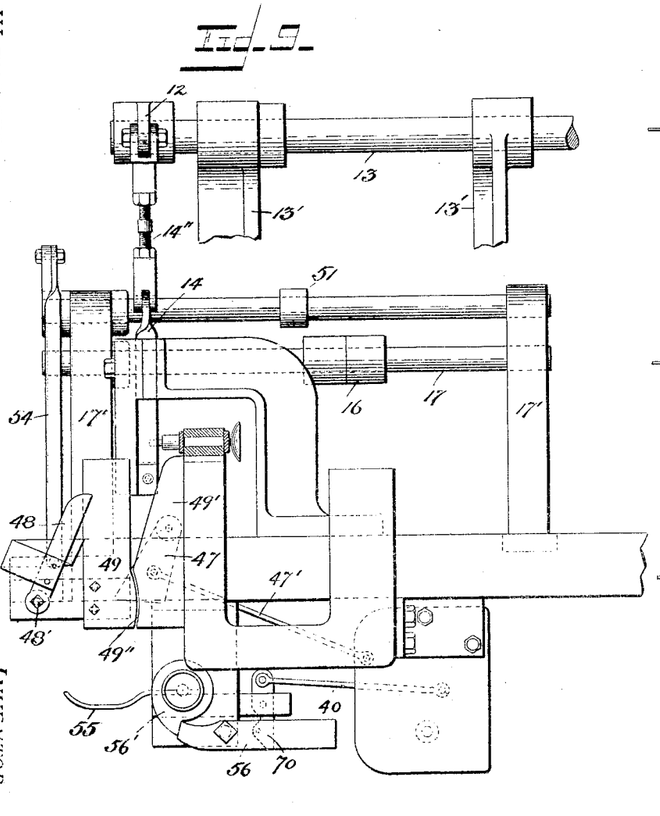
Fig. 9 is an enlarged fragmentary view of the mechanism illustrated in Fig. 4.

Coöperating with the twisting device hereinbefore described is the loop-former, which consists of a crank 19', mounted upon a transverse shaft 19, which is journaled in vertical brackets on the machine-frame in front of the twisting-spindle. Projecting from the inner face of the crank 19' are two hardened-steel rolls $19^2$ $19^3$, as indicated in Figs. 11, 12, 13, and 14, said rolls serving to engage the end of the wire and bend the same into a loop over the pin or arbor 82 of the shuttle as the latter is brought to rest at the end of its return movement. As will be noted from the illustrations in the figures referred to, the two rolls 19² and 19³ are each located eccentrically with respect to the axis of the crank, so that as the latter is moved from its normal position (shown in Fig. 12) the two rolls will move in circular paths on each side of the shuttle-pin 82 and bend the end of the wire over against the body portion thereof to form the loop. A positive oscillatory movement occurring at appropriate intervals is imparted to the loop-forming crank 19' by means of a segmental gear 18, fast upon the shaft 17 and meshing with a toothed gear on the end of the shaft 19', as indicated in Fig. 6. Secured to the shaft 17 is an actuating-arm 18', having on the end thereof a roller 16, which engages the edge of the timing-cam 9 on the shaft 7, so that as said cam is rotated the higher portion thereof rocks the actuating-arm 18', shaft 17, segmental gear 18, and loop-forming crank 19', thereby forming the loop in the end of the wire, after which the arm 18', following the contour of the cam 9, moves the mechanism described in the opposite direction, so that the loop-forming crank is moved out of engagement with the formed loop, leaving the latter upon the pin or arbor 82 of the shuttle, which after the loop has been twisted is subsequently moved along the lower track-section 59 until it reaches the outer end of its travel. At this stage of the operation the cutting mechanism is brought into operation to sever the wire, and thereby complete the bale-tie. Said cutting mechanism consists of a vertically-reciprocating knife 14, sliding in a suitable guide-casing 14', removably secured to a bracket which is mounted on the bed-plate. Reciprocatory motion is imparted to the knife 14 at proper intervals by means of a shaft 13, which is connected with said knife 14 by a lever-arm 12 and an adjustable link 14". The shaft 13 is actuated at the exact moment to sever the wire by the cut-off cam 8, which engages the end of the lever-arm 11, fast to said shaft 13. The cam 8 is mounted upon the shaft 7; but instead of being keyed to said shaft, as are the other cams, it is adjustably connected to cam 9, an annular series of tapped holes 9' being provided in the face of said cam 9 to be engaged by a threaded bolt passed through a short slot 8' in the face of cam 8. It will be seen, therefore, that by adjusting cam 8 with respect to cam 9 the knife 14 may be operated to sever the wire at any desired point in the operation of the machine, so that bale-ties of different lengths may be produced.

Figures 10, 11, 34, 35:
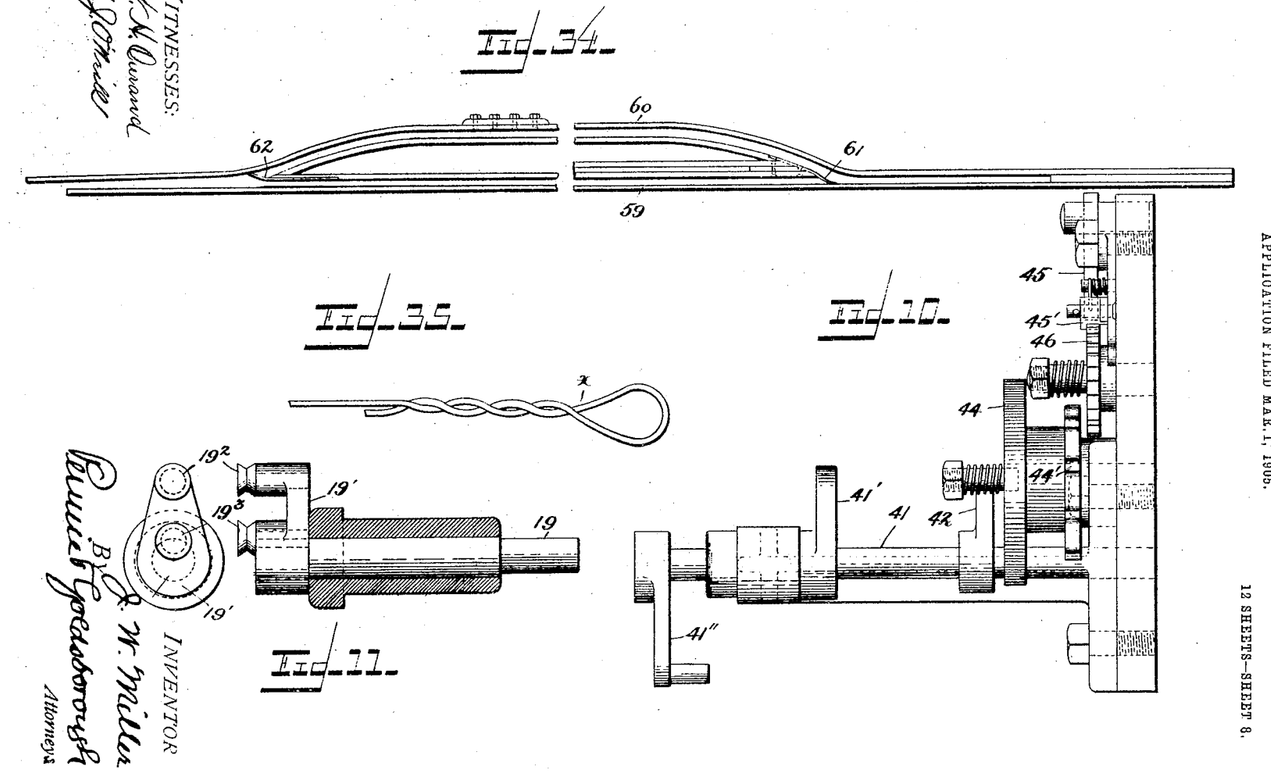
Fig. 10 is an end elevation of the counting mechanism.
Fig. 11 shows the loop-forming crank in side and end elevation.
Fig. 34 is a detail view of the track or shuttle-guide.
Fig. 35 is a plan view of the finished loop at the end of a bale-tie.
Figure 12:
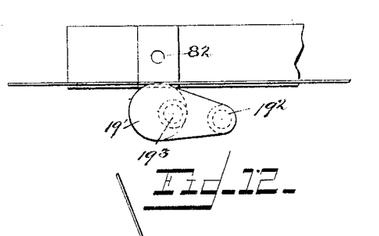
Figs. 12, 13, and 14 are detail views of the loop-forming mechanism, showing the successive positions of the crank in the loop-forming operation.
Figure 13:
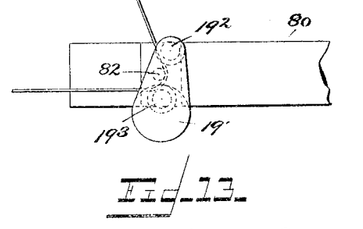
Figure 14:
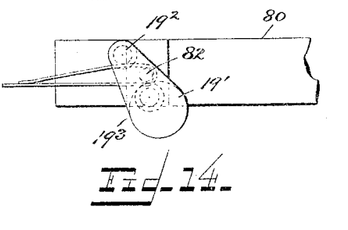
Figures 15, 16, 17, 18, 19:
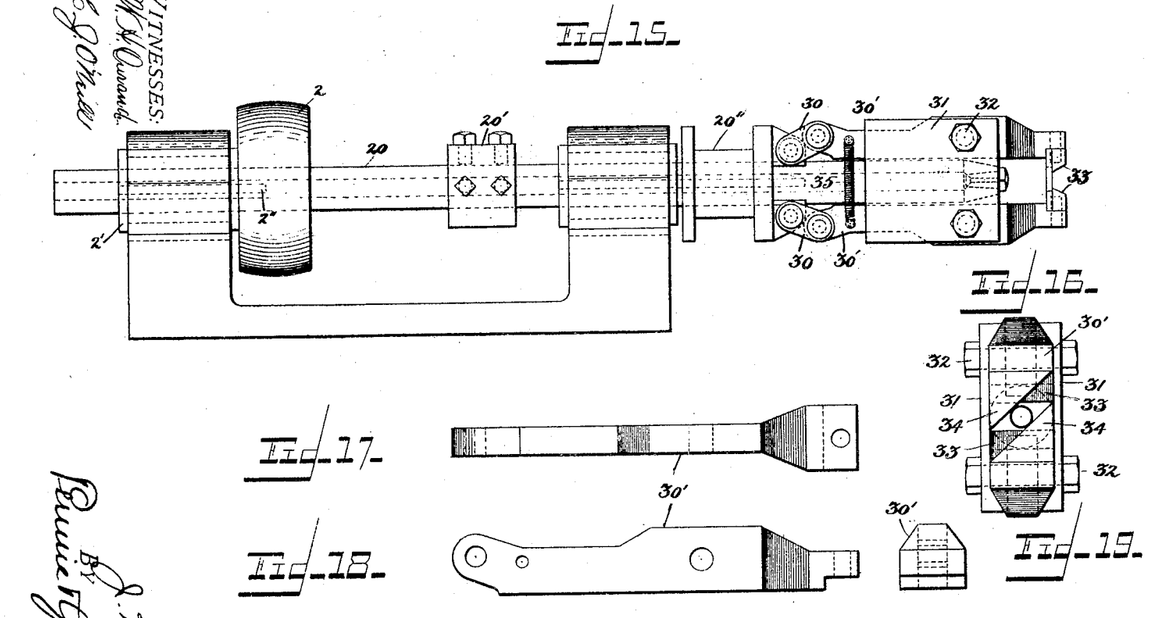
Fig. 15 is an enlarged side elevation of the twisting-spindle and its mounting.
Fig. 16 is an end view of the twister.
Figs. 17, 18, and 19 are a plan view, elevation, and end view, respectively, of the levers carrying the clamping-jaws.
Figure 20:
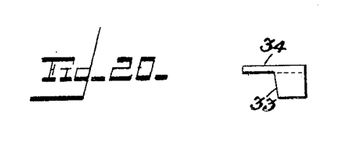
Figs. 20, 21, and 22 are detail views of each of the clamping-jaws.
Figure 21:
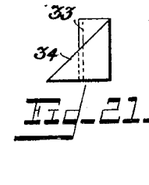
Figure 22:
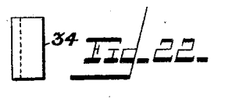
Figures 23, 24, 25, 26, 27, 28, 29, 30:
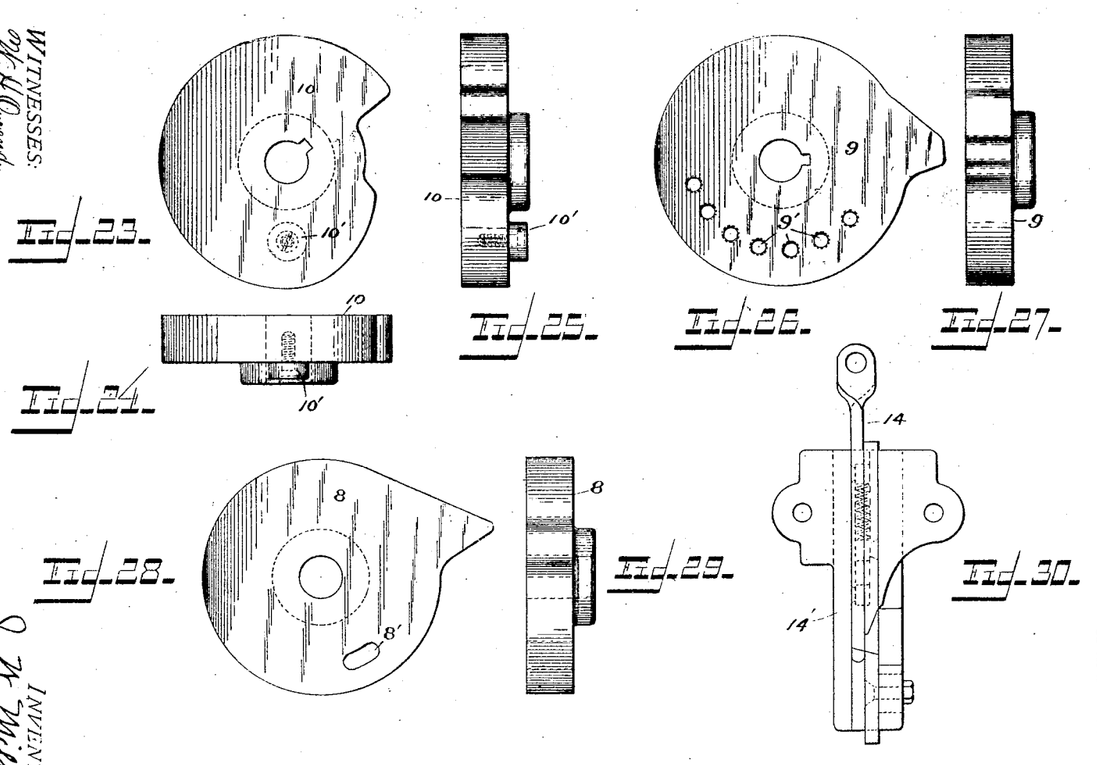
Figs. 23, 24, and 25 are a front elevation, a plan, and an end elevation, respectively, of the cam for controlling the twister.
Figs. 26 and 27 are front and end elevations of the cam for operating the loop-forming mechanism.
Figs. 28 and 29 are corresponding views of the cut-off cam.
Fig. 30 is a detail of the cutter mechanism.
Figure 36:
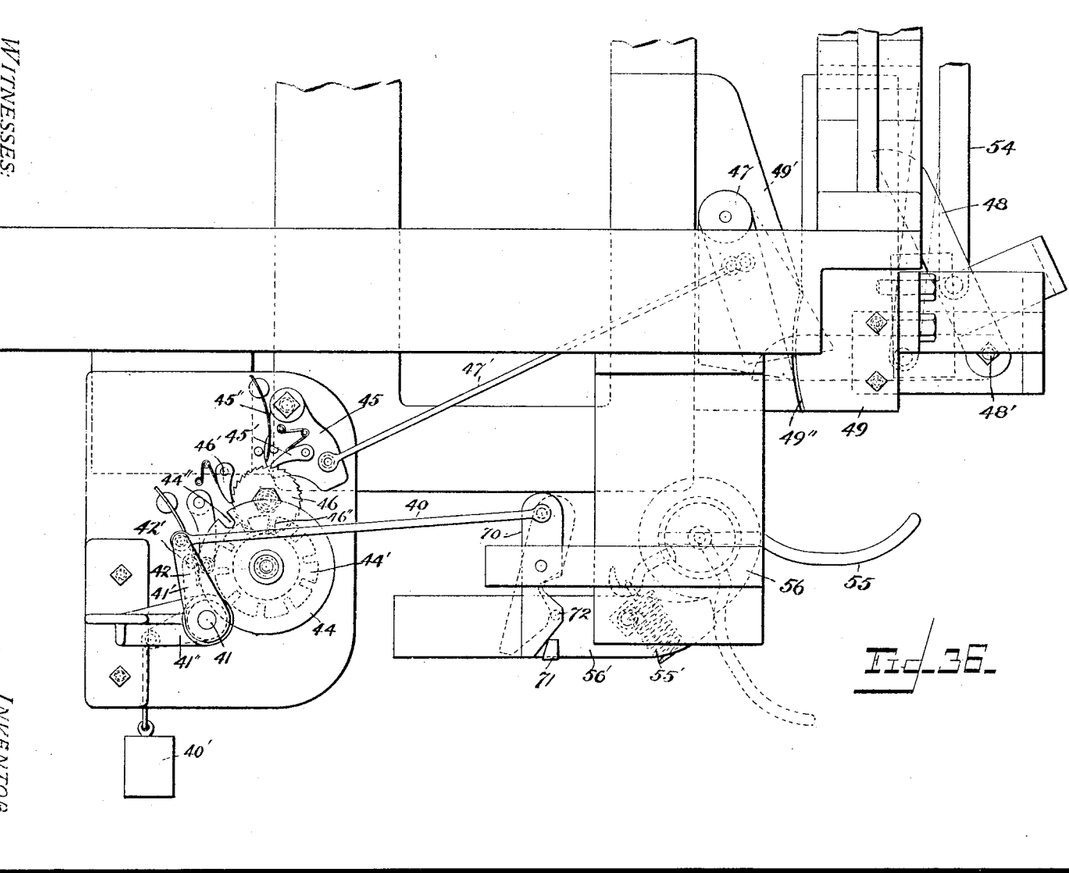
Fig. 36 is a side elevation of the counting mechanism, the receiving-rack, and the connections for operating the same.

As thus far described the operation of the machine is as follows: The end of a wire strand is fed from a suitable reel under the guide-roll 57 to the straightening-rolls 58, through the hollow twister-spindle 20, and under the pin or arbor 82 of the shuttle, which lies adjacent to the clamping-jaws of the twister. The loop-forming crank is then operated by the oscillating segmental gear 18 on the shaft 17, which latter is rocked by the arm 18', engaging the cam 9, as aforesaid, and the end of the wire is bent over the pin 82 in the form of a loop, as shown in Fig. 14. The loop-forming mechanism is then retracted by a spring, (not shown,) attached to arm 18', and the machine is ready to begin the twisting operation in which the free end of the loop and the body of the wire are securely twisted together, as illustrated in Fig. 35. It is to be noted that the clamping-jaws of the twister are normally removed sufficiently from the pin or arbor 82 on the shuttle to permit the end of the wire to be folded back by the loop-forming crank until said end lies snugly against the main or body portion of the wire. The continued rotation of shaft 7 brings the lower portion of cam 10 into engagement with the bowl 23", so that the bell-crank 23 24 may be rocked by spring 29 to advance the spindle 20 until the latter is stopped by the adjustable collar 20'. This brings the clamping-jaws in position to engage the contiguous strands of wire, and as the spring 29 continues the motion of the bell-crank 23 24 the latter slides collar 20" along the spindle and causes the toggles 30 30 to rock the arms 30' 30' on their pivots 32 32, thereby bringing the clamping-jaws into engagement with the strands of the loop. As the spindle is continuously rotated, the wires held by the clamping-jaws will be securely twisted together, the straight portions 33 and the inclined edges 34 of said jaws coöperating to hold the contiguous strands of the loop firmly together during the twisting operation. After the twist has been put in the loop, bowl 23" on the end of the bell-crank 23 24 passes into engagement with the higher portion of the cam 10, and said bell-crank is rocked against the tension of spring 29 and serves, first, to slide the collar 20" backward on the spindle, thereby straightening out the toggles 30 30 and permitting spring 35 to open the clamping-jaws and subsequently retracting the spindle as a whole. During these operations it is understood, of course, that the shuttle remains stationary, due to the fact that the link connecting the latter with the drive-chain is passing around sprocket-wheel 38. After the twisting operation the shuttle still carrying the loop suspended upon the pin or arbor 82 is advanced by the feed-chain along the lower trackway 59, and when the wire has been drawn through the spindle 20 to form the desired length of tie the cam 8 through the rock-shaft 13 and arms 11 and 12 brings the knife 14 down and severs the wire. At the same time the forward or loop end of the severed portion is stripped from the shuttle by the stripping mechanism, while the other end of the continuous strand of wire projects from the end of the twister-spindle in position to be engaged by the pin or arbor of the other shuttle as the latter is drawn back by the drive-chain. As the shuttle carrying the loop of the bale-tie approaches the point at which the tie will be of proper length the stop 84 on the arbor is engaged by the wedge 86 and said arbor is retracted, thereby permitting the loop end of the tie to fall. As will be understood, this operation is continuous, one shuttle being advanced to draw out the looped end of the wire preparatory to severing the same and completing the tie and the other shuttle returning along the upper trackway to subsequently coöperate with the loop-forming device in forming the next succeeding tie. As the ties are completed they are dropped into an appropriate rack or basket 55, which is pivoted in suitable brackets depending from the under side of the machine below the path of travel of the shuttles. Said rack consists of a long trough-like receptacle adapted to receive a given number of ties—say two hundred and fifty—and to discharge the same when the exact number has been delivered thereto. This discharging operation is effected by the coöperation of a suitable counting mechanism, which in turn is actuated step by step by the completed ties as they are delivered from the machine. It has been suggested heretofore that a suitable receiving-rack be actuated to discharge the accumulated ties by the coöperation of a counting device, the latter being brought into operation by some moving part of the tie-forming mechanism and not by the completed tie itself. It has been found in practice, however, that machines of this type do not deliver bundles containing the same number of ties for each successive operation, for it is obvious that should the machine fail to make a tie during any one or more operations the counting mechanism would nevertheless be operated, and consequently the receiving rack or basket would be tripped by the counting device at the usual time, irrespective of the number of ties actually delivered to the rack or basket. In order to avoid this difficulty and to insure exactly the same number of ties to a bundle delivered by the rack or basket, the discharge of said rack or basket is made dependent upon the actual delivery of a definite number of completed ties. The end of each tie as it is severed from the continuous strand of wire drops into a slot 49″ between two face-plates 49 49′, located just ahead of the knife 14. This slot tapers toward its lower end, where it is given a curvilinear path, so that as a groove wears in lever 48 it will not catch and bend the bale-tie, said curve having the same center as lever 48. Lying across the slot and normally closing the same is a tail or gate 47, which is pivoted to the side of the plate 49′, which tail or gate effectually blocks the slot to the passage of the tie until said tail or gate has been forcibly displaced. In order to force the tie through the slot and at the same time to move the gate 47 aside, there is pivoted to the side of the machine-frame a pair of rocking arms 48, to which motion is imparted by a link 54, connected to a rock-lever 53, mounted upon a shaft 50, journaled in the pedestals 17′ 17′ above the shaft 17, which shaft 50 is oscillated at appropriate intervals by a roll 10′ on the inner face of the cam 10, which engages an arm 51, secured to shaft 50. The roll 10′ is so located on the cam 10 that the shaft 50 is rocked, and the arms 48 are thereby brought down across the slot just after the bale-tie has been cut off by the knife 14 and stripped from the shuttle-arbor 82. As the arms 48 descend they engage the end of the bale-tie lying in the slot 49″ and force the same through said slot, after which the tie drops into the rack or basket 55. In its passage through the curvelinear portion of the slot 49″ the wire forces the pivoted tail or gate aside, and thereby operates the counting mechanism, which is preferably constructed as a step-by-step indicator connected to the machine-frame. To effect this successive operation of the counting mechanism, the tail or gate is connected by a link 47′ with a swinging frame 45, mounted on the framework of the counting device, as clearly shown in Fig. 36. This frame carries a spring-pressed pawl 45′, which engages and rotates one tooth at a time a ratchet-wheel 46. A flat spring 45″, secured at one end to the frame of the counting device and engaging a pin on said swinging frame at the other end, serves to swing said frame outward in position for a subsequent operation and also moves the tail or gate 47 across the slot 49″ to be engaged by the next succeeding tie. The ratchet-wheel 46 is provided with a lateral pin which engages a star-wheel 44′, mounted upon the main arbor of the counting device. Mounted upon the same axis as the star-wheel is a disk 44, having a slot or socket 44″ in its periphery. Engaging the periphery of the disk 44 is a pin 42′, carried by a crank-arm 42, secured to a rock-shaft 41, which shaft is normally subjected to the force exerted by a weight 40′, suspended from a crank 41″ thereon, which tends to hold the roller 42′ out of engagement with the periphery of the disk 44. Pivoted to the machine-frame behind the basket 55 is a detent 70, which is connected to a crank 41′ on shaft 41 by a rod 40, the various parts being so related that the pin 42′ is held close to the periphery of disk 44. Said detent 70 normally occupies the position shown in full lines in Fig. 36, so as to cover a pin or stud 72, projecting from the side of a latch or pawl 56′, which engages a ratchet 56 on the side of the rack or basket 55 to hold the latter in its horizontal position to receive the finished bale-ties. Secured to the bell-crank 23 24 is angular arm 71, the end of which tends to move into engagement with the pin 72, and thereby trip the latch 56′ and release the rack or basket;

but the end of said arm 71 is normally deflected by the inclined end of the detent 70, so that the arm 71 does not engage the pin 72 until said detent has been moved to the dotted position shown in Fig. 36, and this is only effected when the counting mechanism has been actuated to bring the slot or socket 44'' into registry with the pin 42' on the end of arm 42—that is to say, when the counting mechanism has registered a given number of completed bale-ties. The end of arm 71 is sufficiently resilient to be deflected by the inclined end of detent 70, while the latter is held from movement by pin 42', engaging the periphery of disk 44, as explained. When, however, the slot 44'' is in position to receive said pin 42', said detent 70 is no longer locked in position to cover pin 72, and as arm 71 rises it forces said detent aside against the countervailing pull of weight 40' and trips the pawl 56' to release the basket 55. As the latch 56' is tripped out of engagement with the ratchet on the rack or basket the weight of the bale-ties in the latter is sufficient to trip said basket into the position shown in dotted lines in Fig. 36, when the bundle of ties is discharged. A spring 55', secured at one end to the machine-frame and at the other to a projecting hook on the basket, serves to return the latter to its horizontal position ready to receive the completed ties. Upon the withdrawal of arm 71 from engagement with pin 72 ratchet 56' again locks the basket and weight 40' rocks shaft 41, thereby withdrawing pin 42' from slot 44'' and also moving detent 70 again into position to cover pin 72. As the next complete bale-tie is delivered it moves the counting mechanism forward one step, thereby carrying slot 44'' out of the path of pin 42', and the basket is again locked to receive another full complement of ties before it is again tripped.

Having thus described my invention, what I claim, and desire to secure by Letters Patent, is—

1. In a bale-tie machine, a hollow rotating reciprocatory spindle, clamping-jaws on said spindle, and means for successively advancing the spindle, closing the jaws, releasing the jaws and retracting the spindle.

2. In a bale-tie machine, a hollow rotating reciprocatory spindle, clamping-jaws on said spindle, spring-actuated means for successively advancing the spindle and closing the jaws, and a cam coöperating with said spring-actuated means for permitting the jaws to open and for retracting the spindle.

3. In a bale-tie machine, a hollow rotating reciprocatory spindle, clamping-jaws pivoted on said spindle, a spring connecting said jaws to open the same, a sliding collar on the spindle connected with said jaws to close the same against the tension of said spring, a spring-actuated lever connected to said collar to advance both the spindle and collar and subsequently the collar alone, and a cam to retract said spring-actuated lever.

4. In a bale-tie machine, a hollow rotating reciprocatory spindle, clamping-jaws pivoted on said spindle, a spring connecting said jaws to open the same, a sliding collar on the spindle, toggle-levers connecting the collar and the jaws to close the latter, a stop on the spindle to limit the advance thereof, a spring-actuated lever connected to said collar to simultaneously advance the spindle and collar and subsequently advance the collar alone, and a cam to retract said spring-actuated lever.

5. In a bale-tie machine, a hollow rotating reciprocatory spindle, clamping-jaws on said spindle, loop-forming means coöperating therewith, and means to advance the spindle, to close the jaws upon the loop to twist the latter and subsequently open the jaws and retract the spindle.

6. In a bale-tie machine, a hollow rotating reciprocatory spindle, clamping-jaws on said spindle, loop-forming means coöperating therewith, spring-actuated mechanism for advancing said spindle and closing said jaws to twist the loop, and means coöperating with said spring-actuated mechanism to retract the spindle and permit the jaws to open.

7. In a bale-tie machine, a loop-former comprising an oscillatory crank having rolls thereon, adapted to engage the end of a wire and fold the same back upon the body thereof.

8. In a bale-tie machine, a loop-former comprising an oscillatory crank having rolls thereon, a loop-pin coöperating with said rolls, and means for oscillating said crank to cause the rolls to fold the end of a wire over the loop-pin.

9. In a bale-tie machine, a shuttle having a loop-pin thereon, an oscillatory crank having rolls thereon normally lying on the same side of said loop-pin, and means for oscillating said crank to bring the rolls on opposite sides of said loop-pin and thereby bend the end of a wire over said pin.

10. In a bale-tie machine, a shuttle having a loop-pin thereon, an oscillatory crank having rolls thereon coöperating with said loop-pin to bend the end of a wire over the latter, a segmental gear for oscillating said crank, and means for actuating said segmental gear.

11. In a bale-tie machine, a shuttle having a loop-pin thereon, an oscillatory crank having rolls thereon coöperating with said loop-pin to bend the end of a wire over the latter, a segmental gear for oscillating said crank, a rock-lever connected to said segmental gear, and a rotary cam for actuating said rock-lever.

12. In a bale-tie machine, a shuttle carrying a loop-pin, an oscillatory crank having rolls thereon coöperating with said loop-pin to bend the end of a wire over the latter, a hollow rotating reciprocatory spindle through which the wire is passed to the loop-forming apparatus, clamping-jaws on said spindle, means for oscillating the crank, and means for successively advancing the spindle and closing the jaws for twisting the loop.

13. In a bale-tie machine, a shuttle carrying a loop-pin, an oscillatory crank having rolls thereon coöperating with said loop-pin to bend the end of a wire over the latter, a hollow rotating reciprocatory spindle through which the wire is passed to the loop-forming apparatus, clamping-jaws on said spindle, means for oscillating the crank, spring-actuated means for successively advancing the spindle and closing the jaws, and a cam coöperating with said spring-actuated means for permitting the jaws to open and for retracting the spindle.

14. In a bale-tie machine, a reciprocatory loop-pin, means for looping the wire around the same, a twister coöperating with the loop-forming apparatus, comprising a rotating reciprocatory spindle having clamping-jaws thereon, and spring-actuated means for successively advancing said spindle and closing the jaws on the loop.

15. In a bale-tie machine, a reciprocating shuttle, a spring-projected loop-pin slidably mounted in the body of the shuttle, and means on the machine-frame for retracting said pin to free the loop.

16. In a bale-tie machine, a reciprocating shuttle, a spring-projected loop-pin slidably mounted in the body of the shuttle, a stop on said pin, and a cam on the machine-frame to engage the stop and retract the pin to free the loop.

17. In a bale-tie machine, a reciprocating shuttle formed of spaced cheek-plates, a reciprocatory loop-pin mounted in said plates, a spring on said pin for normally projecting the same, and coöperating members on the pin and the machine-frame to retract the pin and free the loop.

18. In a bale-tie machine, means for feeding and looping the wire, means for twisting the looped end of the wire, a cutter for severing the wire into lengths, and adjustable means for varying the operation of the cutter whereby ties of different lengths may be produced.

19. In a bale-tie machine, means for feeding and looping the wire, means for twisting the looped end of the wire, a cutter for severing the wire into lengths, a lever for actuating the cutter, and an adjustable cam for operating said lever, whereby ties of different lengths may be produced.

20. In a bale-tie machine, a rack for receiving the finished ties, and means controlled by the passage of the finished ties to the rack for discharging the ties from the rack when a predetermined number of ties have been delivered to the rack.

21. In a bale-tie machine, a rack for receiving the finished ties, a counting mechanism operated by the passage of the completed ties to the rack, and means set in operation by the counting mechanism for discharging the ties from the rack when a predetermined number of ties has been delivered to the rack.

22. In a bale-tie machine, a rack for receiving the finished ties, a gate actuated by the passage of each tie from the machine to the rack, a counting mechanism operated by said gate, and means controlled by said counting mechanism for discharging the ties from the rack when a predetermined number of ties has been delivered to said rack.

23. In a bale-tie machine, a pivoted rack for receiving the finished ties, a detent for holding said rack in position, means to release said detent, a counting mechanism operated by the passage of a completed tie to the rack, an abutment to prevent the operation of the detent-releasing means, and means controlled by the counting mechanism to move said abutment and release the rack when a predetermined number of ties has been delivered to said rack.

24. In a bale-tie machine, a twister, comprising a hollow rotating spindle, and clamping-jaws pivoted on the end of said spindle, each of said jaws having a horizontal gripping edge and an inclined gripping edge, the corresponding edges of the respective jaws coöperating to hold the tail of the loop firmly against the body of the wire.

In testimony whereof I affix my signature in presence of two witnesses.

JOHN W. MILLER.

Witnesses:
F. T. PULSE,
L. W. HAWKINS.